United States Patent [19]

Gioeni et al.

[11] 4,429,070

[45] Jan. 31, 1984

[54] TWO PHASE ALLOY POLYMER FROM COREACTED BLENDS OF AN ACID CONTAINING EMULSION COPOLYMER AND A CHLOROHYDROXY AMMONIUM LIPOSALT EMULSION COPOLYMER

[75] Inventors: Mary L. Gioeni, Ambler; Richard F. Merritt, Ft. Washington, both of Pa.

[73] Assignee: Rohm and Haas Company, Philadelphia, Pa.

[21] Appl. No.: 320,283

[22] Filed: Nov. 12, 1981

[51] Int. Cl.$^3$ .............................................. C08L 37/00
[52] U.S. Cl. .................................................... 524/517
[58] Field of Search ................................. 524/517, 521

[56] References Cited

U.S. PATENT DOCUMENTS

| | | | |
|---|---|---|---|
| 3,026,281 | 3/1962 | Harren et al. | 524/517 |
| 3,035,004 | 5/1962 | Glavis | 524/517 |
| 3,037,952 | 6/1962 | Jordan et al. | 524/521 |
| 3,678,098 | 7/1972 | Lewis et al. | 526/292.2 |

Primary Examiner—Joseph L. Schofer
Assistant Examiner—N. Sarafim
Attorney, Agent, or Firm—Michael B. Fein

[57] ABSTRACT

Composition useful as an emulsion for coating compositions, binders for non-wovens, adhesives, and the like comprising a blend of an emulsion acid copolymer and an emulsion halohydroxypropyl ammonium liposalt copolymer, at least one of which being film forming. Also, a process for producing tough, solvent resistant films, and the reacted films.

11 Claims, No Drawings

TWO PHASE ALLOY POLYMER FROM COREACTED BLENDS OF AN ACID CONTAINING EMULSION COPOLYMER AND A CHLOROHYDROXY AMMONIUM LIPOSALT EMULSION COPOLYMER

BACKGROUND OF THE INVENTION

1. Field of the Invention

This invention relates to room temperature curable coating compositions, binders for non-wovens, and adhesives.

2. Description of the Prior Art

The highest quality, best performing film forming polymers to date have been cured with aminoplasts. However, due to problems with the use of formaldehyde, new coating, adhesive, and binder compositions have been needed which meet the performance specifications of such aminoplast compositions without the use of formaldehyde.

Low energy curing ("LEC") compositions which are formaldehyde-free have been previously suggested, but are, for the most part, relatively costly and do not perform adequately for many applications.

Oil soluble low temperature curing quaternary ammonium liposalt monomers have been described in a recent patent application of Thomas W. Hutton and Richard F. Merritt filed Aug. 7, 1981, Ser. No. 291,010, now pending as have been homopolymers, copolymers of such monomers, and copolymers of such monomers with other ethylenically unsaturated monomers in the manner shown in U.S. Pat. No. 3,678,098. Also taught are activation of such polymers by raising the pH to make reactive and readily crosslinked coatings, binders, and adhesives.

SUMMARY OF THE INVENTION

Since none of the prior art low energy cure, formaldehyde-free systems have the very high performance of the aminoplast systems, it has become an object of the present invention to provide low energy cured, high performing coatings, binders, and adhesives.

An additional object is to provide a unique process for activating and reacting such compositions which provides a long open time.

Another object is to provide films, coatings, binders, and adhesives which have excellent tensile strength and solvent resistance.

These objects, and others which will become apparent from the following disclosure, are achieved by the present invention which comprises in one aspect a composition comprising a blend of (a) an emulsion acid copolymer, and (b) an emulsion halohydroxypropyl ammonium liposalt copolymer, at least one of (a) or (b) being film forming at room temperature. In another aspect the invention comprises activating the composition with base and then applying to a substrate. In another aspect, the invention comprises the tough, solvent resistant films prepared by the process, and the substrates to which the composition has been applied.

DETAILED DESCRIPTION OF THE INVENTION AND THE PREFERRED EMBODIMENTS

The emulsion halohydroxypropyl ammonium liposalt copolymer for use in this invention can be prepared by mixing a solution of the corresponding nitrate with a solution of an anionic surfactant salt, forming an emulsion of the liposalt monomer, and then adding an ethylenically unsaturated comonomer to form a stable monomer emulsion. Then suitable free radical initiator can be added to form the emulsion chlorohydroxypropyl ammonium liposalt copolymer.

The quaternary ammonium monomers have the formula:

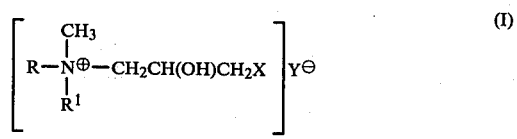

or

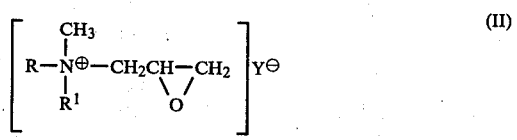

wherein

R is an ethylenically unsaturated organic group;

$R^1$ is a linear $C_1$ to $C_4$ alkyl group, optionally hydroxy substituted;

X is chlorine, bromine, iodine or a functional equivalent of a halogen;

$Y^\ominus$ is a surfactant anion.

R can be $CH_2=C(R^4)-C(O)Z-A-$ wherein $R^4$ is hydrogen or methyl;

Z is oxygen or $-NR^5-$ wherein $R^5$ is hydrogen or $C_nH_{2n+1}$;

n is 1 to 10; and

A is a $C_2$-$C_4$ alkylene or a polyoxyalkylene group of the formula:

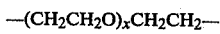

wherein x is 1 to 100;

R can also be $R^3-CH_2-(CHR^2)_n-CH_2-$ (III);

wherein n is 0 to 1;

$R^2$ is H or OH; and $R^3$ is an alkenoxy group containing an allyl group or a carbalkenoxy group containing a double bond functionally equivalent to an isolated vinyl group:

R can also be:

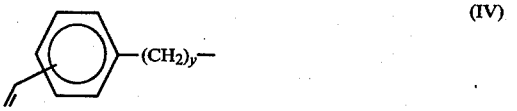

wherein y is an integer from 1 through 4.

Preferably, the quarternary ammonium monomer is the readily available reaction product of dimethyl aminoethyl methacrylate with nitric acid and epichlorohydrin or a mixture of epichlorohydrin and propylene oxide.

This monomer is made into the corresponding liposalt by anion exchange with anionic surfactant.

Suitable anionic surfactants are those which are surface active in water, that is, they contain an anion which concentrates at the air-water interface and thereby lowers the surface tension of the water. Among the classes of surfactant anions that are useful in this invention are those given in the classification scheme on pages 15 and 16 of Schwartz and Perry, *Surface Active Agents,* Interscience Publishers 1949, herein incorporated by reference. As used herein, the term "surfactant anion" embraces mixtures of surfactant anions including commercial materials which often are mixtures of species varying in hydrocarbyl chain length. Among the useful surfactant anions are those which are relatively hydrophilic in the hydrophile-lipophile balance classification of surfactants.

Many types of anionic surfactants are known, and are generally classified by the chemical nature of the anion; particularly useful examples are the sulfuric esters or sulfates joined directly or through an intermediate linkage to a hydrophobic group, alkane sulfonic acids with the sulfonic or sulfonate linked directly to a hydrophobe or linked through an intermediate linkage such as an ester or an amide or ether linkage, alkyl aromatic sulfonic acids again either directly or indirectly linked, phosphates or phosphoric acids, thiosulfates, sulfonamides, sulfamic acids and so forth. Preferred anions are alkyl sulfates having an alkyl group of 6 to 20 carbon atoms, such as lauryl and myristyl sulfates; aromatic sulfonates of 8 to 24 carbon atoms, such as dodecyl benzene sulfonate; alkyl and alkaryl oxyethylene sulfates having up to 10 oxyethylene units wherein the alkyl group has at least 8 carbons and may have up to a number corresponding to 20 plus the number of oxyethylene units in the anion; and dialkyl sulfosuccinates having a total of 6 to 30 carbon atoms in the two alkyl groups. The most preferred anions are dodecyl benzene sulfonate, lauryl sulfate, myristyl sulfate, tridecyl sulfate, dioctyl sulfosuccinate, diisobutyl sulfosuccinate and dioctyl phosphate. The various anionic surfactants are usually commercially available as alkali metal salts, ammonium salts or salts of low molecular weight amines.

The suitable comonomers are any ethylenically unsaturated monomers except acids or anhydrides, since all of the acid should be in the emulsion acid copolymer. Examples of comonomers are acrylate esters, preferably of $C_1-C_8$ alcohols such as ethyl acrylate, methacrylate esters, preferably of $C_1-C_8$ alcohols such as methyl methacrylate, styrene, alkyl styrenes, vinyl esters, preferably of $C_1-C_{12}$ acids such as vinyl acetate, acrylamide, methacrylamide, acrylonitrile, maleic anhydride, vinylidene chloride, N-vinylpyrrolidone, maleate esters, preferably of $C_1-C_8$ alcohols, fumarate esters, preferably of $C_1-C_8$ alcohols, propylene, ethylene and other olefins, vinyl chloride, vinyl toluene, and the like.

On an weight basis, the amount of quaternary ammonium liposalt monomer in the copolymer should be about 10% or less.

To the resultant emulsion (A) is blended with emulsion acid copolymer (B) in a ratio of about 100:1 to 2:3 by weight on a solids basis.

The emulsion acid copolymer is prepared by polymerizing one or more of the comonomers mentioned above with a minor amount of an unsaturated acid monomer, among which are monocarboxylic acids, preferably acrylic, methacrylic, crotonic and half esters of maleic and fumaric, with acrylic acid and methacrylic acid being most preferred; as well as polycarboxylic acids such as maleic, fumaric and, preferably, itaconic. The amount of acid monomer in copolymer (B) should be about 1 to 20 percent by weight, preferably 5 to 15, and more preferably 8 to 12 percent.

The emulsions of (A) and (B) are stable when blended, usually having a pH below 6. By addition of alkali, the pH is raised and the emulsion is activated for curing. Suitable alkali are sodium hydroxide, potassium hydroxide, and the equivalent.

Generally the compositions can be cured with relatively low energy, usually at room temperature or slightly above, up to about 350° F., to form excellent coatings, binders, adhesives, and the like.

It is preferred to have one of the two polymers film forming at room temperature and one non-film forming at application temperature so as to have the non-film forming polymer acts as reinforcement for the blend. When the polymers are properly selected, they are not mutually soluble or compatible, and an alloy is formed in the cured product which has excellent solvent resistance and toughness.

The blends are particularly useful in clear or pigmented coatings for use on soft substrates such as vinyls, leather, and paper, as well as on hard substrates such as wood, metal, mineral, and road surfaces. The coating, in these uses, serves decorative and/or protective purposes, such as wear resistance, solvent resistance, detergent resistance, abrasion resistance, appearance improvement, etc. As pigment print binders, the polymers are useful in printing inks which furnish durable design or decoration for woven or non-woven fabrics, films, rigid panels, etc. Fibers of either synthetic or natural materials such as polyolefins, polyesters, rayon, nylon, fiberglass, wood, wool, and the like may be bonded by means of the compositions of the invention to furnish non-woven fabrics, particularly those of high durability for uses such as clothing interliners, fiberfill insulation, filter material, diaper components, and various forms of wearable and decorative fabrics. Used alone or in formulations, these compositions offer strong and durable adhesives particularly useful for the lamination of fabrics, woven or non-woven, films, hard panels, foamed materials, and the like, in any combination to form two-layer or multi-layer laminates. Employed as a flock adhesive, or a component thereof, the composition serves to adhere fiber flocks of materials such as nylon, polyester or rayon to a substrate, such as woven fabric, non-woven fabric, rigid panels and foams. Towels, wipes and other paper products with good mechanical strength and water resistance are made by binding wood fibers, or mixtures of wood fibers with other fibers, employing the instant composition as binders.

The following examples are presented to illustrate a few embodiments of the invention; although the invention is certainly not limited to the few illustrated embodiments. All parts and percentages are by weight unless otherwise indicated.

EXAMPLE 1

Preparation of emulsion acid copolymer

An emulsion polymer at 38.2% solids was prepared by polymerizing 844 parts methyl methacrylate and 31 parts acrylic acid with an initiator system consisting of one part ammonium persulfate, 0.5 sodium dithionite (Lykopon brand) and 0.5 part sodium sulfoxylate formaldehyde (Formopon brand) and 140.8 parts of a solution of sodium dodecyl benzene sulfonate, 23% active as emulsifier (Siponate DS-4 brand) to form a 96.5 MMA/3.5 AA emulsion acid copolymer.

EXAMPLE 2

Preparation of emulsion halohydroxypropyl ammonium liposalt copolymer 34.5 parts of a 33% active solution in water of the quaternary ammonium ion (hereafter referred to as CH—DMA) obtained by the addition of epichlorohydrin to dimethylaminoethyl methacrylate was added to a solution of 304.3 parts sodium dodecyl benzene sulfonate emulsifier to form a liposalt (hereafter referred to as "CH—DMAL"). The excess soap emulsified the liposalt monomer and 1729 parts ethyl acrylate was added to form a stable monomer emulsion. The monomers were copolymerized by a one shot process at 40.6% solids using 2 parts ammonium persulfate, 1 part sodium dithionite and 1 part sodium sulfoxylate formaldehyde as initiators to form 98.8 EA/1.2 CH—DMAL emulsion chlorohydroxypropyl ammonium liposalt copolymer.

EXAMPLE 3

Example 2 was repeated except using 44.4 parts of the CH—DMA solution, 201.4 parts of the sodium dodecyl benzene sulfonate solution (Siponate DS-4) and 723 parts ethylacrylate, and polymerizing at 31.3% solids by a one shot process to prepare a 96.4/EA 3.6/CH—DMAL emulsion halohydroxypropyl ammonium liposalt copolymer.

EXAMPLE 4

Example 1 was repeated except using 317 parts MMA and 83 parts AA and polymerizing at 20.8% solids to prepare a 79.2 MMA/20.8 AA emulsion acid copolymer.

EXAMPLE 5

Example 2 was repeated except using 29.6 parts of the CH—DMA solution in water and 177.7 parts of the sodium dodecyl benzene sulfonate anionic emulsifier, and 732 parts ethyl acrylate, and polymerizing at 31.6% solids to form a 97.6 EA/2.4 CH—DMAL emulsion.

EXAMPLE 6

Example 1 was repeated except using 860 parts MMA and 15 parts AA and polymerizing at 37.2% solids to form a 98.2 MMA/1.8AA emulsion acid copolymer.

EXAMPLE 7(a)

Preparation and activation of emulsion blends (a) 15 parts (on a solids basis) of the emulsion of Example 1 was added to 35 parts (solids) of the emulsion from Example 2 and the mixture was diluted with water. The pH was adjusted to 11.2 with 0.5 N-sodium hydroxide to activate the blend. The activated blend was poured into petri dishes, dried at room temperature and cured at 125° C. for 15 minutes, and thereafter tested for solvent resistance and tensile strength. The results are reported in the table which follows.

(b) Part (a) was repeated except curing at room temperature for 10 days instead of at 125° C., and the resultant properties were the same as in Example 7(a).

EXAMPLE 8

Comparative

A blend was prepared as in Example 7(a)(a) except that the pH was not adjusted.

EXAMPLE 9

Preparation and activation of emulsion blends 6 parts (solids) of the emulsion of Example 1 was added to 14 (solids) parts of the emulsion of Example 3 and activated, dried and cured as described in Example 7(a).

EXAMPLE 10

Preparation and activation of emulsion blends 6 parts (solids) of the polymer emulsion of Example 4 was added to 14 parts (solids) of the polymer of Example 3, and then the blend was diluted, activated, dried, and cured as per Example 7(a).

EXAMPLE 11

10 parts of the latex from Example 6 was added to 10 parts of the latex from Example 3, and then the procedure described in Example 7(a) was carried out.

EXAMPLE 12

12 parts of the latex from Example 1 was added to 35 parts of the latex from Example 5 and the procedure described in Example 7(a) was carried out.

EXAMPLE 13

Evaluation of solvent resistance

This example illustrates evaluation of the swell ratio as an indication of the extent of crosslinking. The greater the extent of crosslinking, the less of a tendency to imbibe solvent and, hence, lower swell ratio numbers.

In this example a portion of the films from each of Examples 7 through 12 was weighed, soaked overnight in dimethylformamide (DMF), and then reweighed. The swell ratio is defined as the ratio of swollen weight to dry weight. The results are reported in the table which follows.

EXAMPLE 14

Determination of tensile strength

Portions of the films were die-cut into a dumbbell shape, the thickness and width of the samples were measured and the samples were stretched to break using an Instron tensile tester. The tension and elongation at break were recorded and tensile stress calculated. The results are reported in the table under "DRY". Other portions of the films were soaked overnight at 60° C. in isopropanol, and the tension and elongation were measured in the same manner. The results are reported in the table under "WET".

EXAMPLES 15 TO 19

An 80 EA/10 AA/10 1,3-butylene glycol diacrylate acid copolymer emulsion was prepared by the procedure of Example 1, blended with the emulsion of Example 5 in various ratios of solids of the liposalt copolymer to the acid copolymer, activated, dried, cured, and tested. The ratios for Examples 15 to 19 were 9/1; 7/3; 1/1; 3/7; 1/9; respectively.

EXAMPLES 20 AND 21

Comparative

Two standard formaldehyde crosslinked methylolacrylamide (MOA) resins were tested for the same properties as the examples of the invention.

EXAMPLE 22

The procedure of Example 2 was used to prepare an 87 EA/10 AN/3 CH—DMAL copolymer emulsion.

EXAMPLES 23 TO 31

Blends of emulsion acid copolymer and emulsion liposalt copolymer having the following overall compositions were prepared by the procedures described in the preceeding examples.

23—79.54 BA/5.6 CH—DMAL/13.7 MMA/1.3 AA
24—46.5 BA/5.6 CH—DMAL/4.65 EA/1.3 AA
25—69 BA/1.1 CH—DMAL/29.7 MMA/0.15 AA
26—54.3 EA/14 AN/1.7 CH—DMAL/25.7 MMA/4.3 AA
27—68.3 MA/1.7 CH—DMAL/25.7 MMA/4.3 AA
28—54.3 EA/14 AN/1.7 CH—DMAL/25.7 MMA/4.3 AA
29—52.7 EA/14 AN/13.4 POCH—DMAL/25.7 MMA/4.3 AA
30—68.3 MA/1.7 CH—DMAL/125.7 MMA/4.3 AA
31—61.3 EA/7 AN/1.7 CH—DMAL/25.7 MMA/4.3 AA

In Example 29, POCH—DMAL is the quarternary ammonium ion obtained by addition of a 50/50 mixture of epichlorohydrin and propylene oxide to dimethylaminoethyl methacrylate.

EXAMPLE 32

(Comparative)

A commercial MOA formaldehyde resin was used.

TABLE

| Example | Swell Ratio DMF | Swell Ratio IPA | Swell Ratio PCE | Strength at Break, psi DRY | Strength at Break, psi WET | Elongation % DRY | Elongation % WET |
|---|---|---|---|---|---|---|---|
| 7 (a) & (b) | 6.3 | — | — | 490 | 140 | 370 | 390 |
| 8 (Comp.) | dis. | — | — | 170 | <50 | >1000 | >1000 |
| 9 | 6.6 | — | — | 830 | 90 | 510 | 270 |
| 10 | 2.8 | — | — | 990 | 160 | 580 | 490 |
| 11 | 7.4 | — | — | 680 | 140 | 90 | 210 |
| 12 | 6.9 | — | — | 900 | 55 | 680 | 330 |
| 15 | — | 1.9 | 3.6 | 370 | 110 | 540 | 250 |
| 16 | — | 1.8 | 3.1 | 580 | 190 | 440 | 180 |
| 17 | — | 1.5 | 2.7 | 420 | 240 | 430 | 200 |
| 18 | — | 1.5 | 2.1 | 230 | 280 | 220 | 90 |
| 19 | — | 1.3 | 1.6 | 170 | 0 | 160 | 0 |
| 20 (Comp.) | — | 2.4 | 3.7 | 360 | 160 | 430 | 200 |
| 21 (Comp.) | — | 3.0 | 7.0 | 390 | 100 | 430 | 120 |
| 22 (Comp.) | 8.3 | — | — | 620 | — | 330 | — |
| 23 | 2.8 | — | — | 200 | — | 1040 | — |
| 24 | 3.2 | — | — | 360 | — | 1260 | — |
| 25 | 1.9 | — | — | 520 | — | 1940 | — |
| 26 | — | — | — | 1900 | — | 360 | — |
| 27 | — | — | — | 1800 | — | 250 | — |
| 28 | — | — | — | 1900 | 230 | 360 | 560 |
| 29 | — | — | — | 2900 | 300 | 250 | 510 |
| 30 | — | — | — | 1800 | 270 | 250 | 510 |
| 31 | — | — | — | 1100 | 150 | 270 | 390 |
| 32 (Comp.) | — | — | — | 1800 | 300 | 160 | 70 |

We claim:

1. Composition comprising an emulsion useful for coating compositions, binders for non-wovens, and adhesives comprising a blend of:
   A. an emulsion acid copolymer, and
   B. an emulsion halohydroxypropyl ammonium liposalt copolymer of a liposalt monomer of the formula

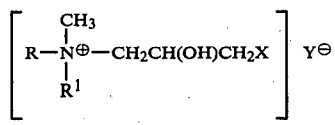

or

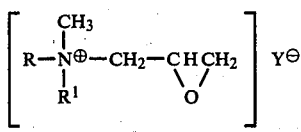

wherein
R is an ethylenically unsaturated group;
$R^1$ is a linear $C_1$–$C_4$ alkyl or hydroxyalkyl group;
X is chlorine, bromine, or iodine; and
$Y^{\ominus}$ is a surfactant anion containing at least 6 carbon atoms or, where said anion contains an aralkyl group, at least 8 carbon atoms,
and at least one other ethylenically unsaturated monomer except acid or anhydride, at least one of A or B being film forming at application temperature, (A) and (B) not being mutually soluble or compatible.

2. Composition of claim 1 wherein the other of A or B is non-film forming at room temperature.

3. Composition of claim 1 wherein one of A or B has a Tg of above 25° C., the other has a Tg below 20° C., and A and B.

4. Composition of claim 1 wherein B is an emulsion chlorohydroxypropyl ammonium liposalt copolymer.

5. Process of producing tough, solvent-resistant, reacted binders, adhesives and coatings from the composition of claim 1, 2, 3, or 4 comprising activating said composition with base and then applying it to a substrate.

6. Process in accordance with claim 5 wherein said composition is cured at room temperature without heating.

7. Article produced according to claim 5.

8. Composition of claim 1 wherein R is $$CH_2=C(R^4)-C(O)Z-A-$$

wherein
$R^4$ is H or $CH_3-$;
Z is O or $-NR^5-$;
$R^5$ is H, $C_nH_{2n+1}$;
n is 1 to 10; and
A is a $C_2$ to $C_4$ alkylene or a polyalkylene group of the formula $-(CH_2CH_2O)xCH_2CH_2$ wherein x is 1 to 100.

9. Composition of claim 1 wherein said ethylenically unsaturated monomer is an acrylate ester.

10. Composition of claim 9 wherein said acrylate ester is ethyl acrylate.

11. Composition of claim 1 wherein said emulsion acid copolymer is a copolymer of one or more ethylenically unsaturated monomers and a minor amount of an unsaturated acid monomer.

* * * * *